(12) United States Patent
Westervelt et al.

(10) Patent No.: US 7,715,031 B2
(45) Date of Patent: May 11, 2010

(54) METHOD AND APPARATUS FOR GENERATING AN IMAGE FOR OUTPUT TO A RASTER DEVICE

(75) Inventors: Robert Thomas Westervelt, Los Angeles, CA (US); Stephen Laurence Schafer, Irvine, CA (US); Kenneth Allen Schmidt, Redondo Beach, CA (US); Eric Random, Redondo Beach, CA (US); Alan D. Curtis, Hermosa Beach, CA (US); David Joseph Chura, Rancho Palos Verdes, CA (US)

(73) Assignee: Kyocera Mita Corporation, Osaka (JP)

( * ) Notice: Subject to any disclaimer, the term of this patent is extended or adjusted under 35 U.S.C. 154(b) by 1070 days.

(21) Appl. No.: 10/172,679

(22) Filed: Jun. 14, 2002

(65) Prior Publication Data

US 2003/0231330 A1 Dec. 18, 2003

(51) Int. Cl.
G06F 3/12 (2006.01)
G06K 15/00 (2006.01)
(52) U.S. Cl. .................... 358/1.15; 358/1.16
(58) Field of Classification Search .......... 358/2.1, 358/1.6, 1.1, 1.9, 1.11–1.18, 21.18, 1.2; 715/502, 205; 717/119, 105; 710/5; 345/418, 345/543, 545
See application file for complete search history.

(56) References Cited

U.S. PATENT DOCUMENTS

| | | | |
|---|---|---|---|
| 4,648,045 A | 3/1987 | Demetrescu | |
| 4,679,038 A | 7/1987 | Bantz et al. | |
| 4,703,515 A | 10/1987 | Baroody, Jr. | |
| 4,933,874 A | 6/1990 | Asada et al. | |
| 4,933,880 A | 6/1990 | Borgendale et al. | |
| 4,942,541 A | 7/1990 | Hoel et al. | |
| 5,050,099 A | 9/1991 | Nishihara | |
| 5,086,497 A | 2/1992 | Horikawa et al. | |
| 5,125,072 A | 6/1992 | Ng | |
| 5,502,804 A | 3/1996 | Butterfield et al. | |
| 5,748,986 A * | 5/1998 | Butterfield et al. | 715/502 |
| 5,754,750 A * | 5/1998 | Butterfield et al. | 345/418 |
| 6,084,688 A | 7/2000 | Stumbo et al. | |
| 6,100,998 A * | 8/2000 | Nagao et al. | 358/1.9 |
| 6,295,134 B1 * | 9/2001 | Hughes | 358/1.13 |

(Continued)

FOREIGN PATENT DOCUMENTS

EP 283 157 7/1988

(Continued)

OTHER PUBLICATIONS

IBM Technical Disclosure Bulletin, vol. 31, No. 10, Mar. 1989, New York U.S., pp. 352-354; Armonk: 'Memory Allocation and Deallocation for Print Data in APA Printers' *the whole document*.

*Primary Examiner*—Thierry L Pham
(74) *Attorney, Agent, or Firm*—Blakely, Sokoloff, Taylor & Zafman LLP

(57) ABSTRACT

A method and apparatus for generating pixelmap images for output to a raster device. The method and apparatus support scheduling and rendering bands, pages or planes from a job using multiple graphics processors and an array of buffers from an intermediate graphic order storage medium. The graphics orders are generated by a graphics order generator subsystem.

19 Claims, 4 Drawing Sheets

U.S. PATENT DOCUMENTS

| | | | |
|---|---|---|---|
| 6,441,919 B1 * | 8/2002 | Parker et al. | 358/1.18 |
| 6,559,958 B2 * | 5/2003 | Motamed et al. | 358/1.13 |
| 6,707,563 B1 * | 3/2004 | Barry et al. | 358/1.14 |
| 6,825,943 B1 * | 11/2004 | Barry et al. | 358/1.15 |
| 2002/0032704 A1 * | 3/2002 | Shima | 707/527 |

FOREIGN PATENT DOCUMENTS

EP    428 370    11/1990

\* cited by examiner

METHOD AND APPARATUS FOR GENERATING AN IMAGE FOR OUTPUT TO A RASTER DEVICE

BACKGROUND

1. Field

This invention relates to the field of image generation, more specifically generating images to be sent to a raster device.

2. Description of the Prior Art

Printing devices encompass a wide variety of output display devices. These output display devices such as laser printers, bubble jet printers, plotters, image setters and other printing devices produce an image or visual representation on the surface of paper or similar materials. Many printing devices form images on a surface by printing dots corresponding to information contained in a bitmap or pixelmap. A raster printing device, for example, forms an image on a surface by printing dots arranged in rows and columns based upon a corresponding pixelmap.

Applications running on a computer system may generate a number of pages or images that are requested to be printed together. This collected group of images and pages is often referred to as a job. A number of jobs can often be requested in a period of time shorter than each job can be printed. These jobs are often queued to be printed after a previously scheduled job is completed.

Pages in a job are often described in a page description language (PDL) which is a high level language for describing objects to be displayed by an output device. These languages are usually interpreted languages that allow for a compact representation of a page.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

Definitions

Printer "Languages"

PCL: Printer Control Language. PCL is a term coined by HP upon introduction of the LaserJet laser printer. It embodies a relatively simple set of escape sequences reminiscent of ANSI 3.64. PCL is considered to be of moderate complexity.

PDL: Page Description Language. PDL's, such as Adobe PostScript, are actual "document" programming languages, much like BASIC, FORTRAN, and C. PDLs are interpreted languages rather than compiled languages. The instructions for how the page is to be formed are described in lexical verbs such as FINDFONT and MOVETO. This means that the parsing and interpretation of these languages must be done in the printer engine itself. Generally, PDLs describe one page at a time, where each page is a separate PDL program. PDLs are considered to be of difficult complexity.

DDL: Document Description Language. DDLs, such as Xerox Interpress or Adobe PDF, are similar to PDLs in that they are programming languages with lexical verbs. The difference between DDLs and PDLs are that DDLs generally describe an entire document consisting of multiple pages. This adds to the storage requirements in that the entire document must be parsed and interpreted before any printing can begin. DDLs are considered to be of difficult complexity.

Banding

Banding involves building an image to be output in strips or "bands".

Banding is a process in which a page to be printed is represented in an intermediate form which describes the graphics operations necessary to construct the pixelmap image for the page. This intermediate form is commonly referred to as a 'display list'. A PDL or PCL emulator firmware generates this display list before a print engine begins the actual printing process. In one embodiment, a Graphics Execution Unit (GEU) executes the display list to form the pixelmap image in bands after the print engine is started. Banding is desirable in printer controllers due to its potential memory savings and system performance improvements.

The graphics orders are designed to be an extremely compact representation of the printed page. Compression of graphics data and the elimination of redundant information in the display list enables the intermediate form of the printed page to be significantly smaller than the actual pixelmap image.

Pixelmap

Figure 5:
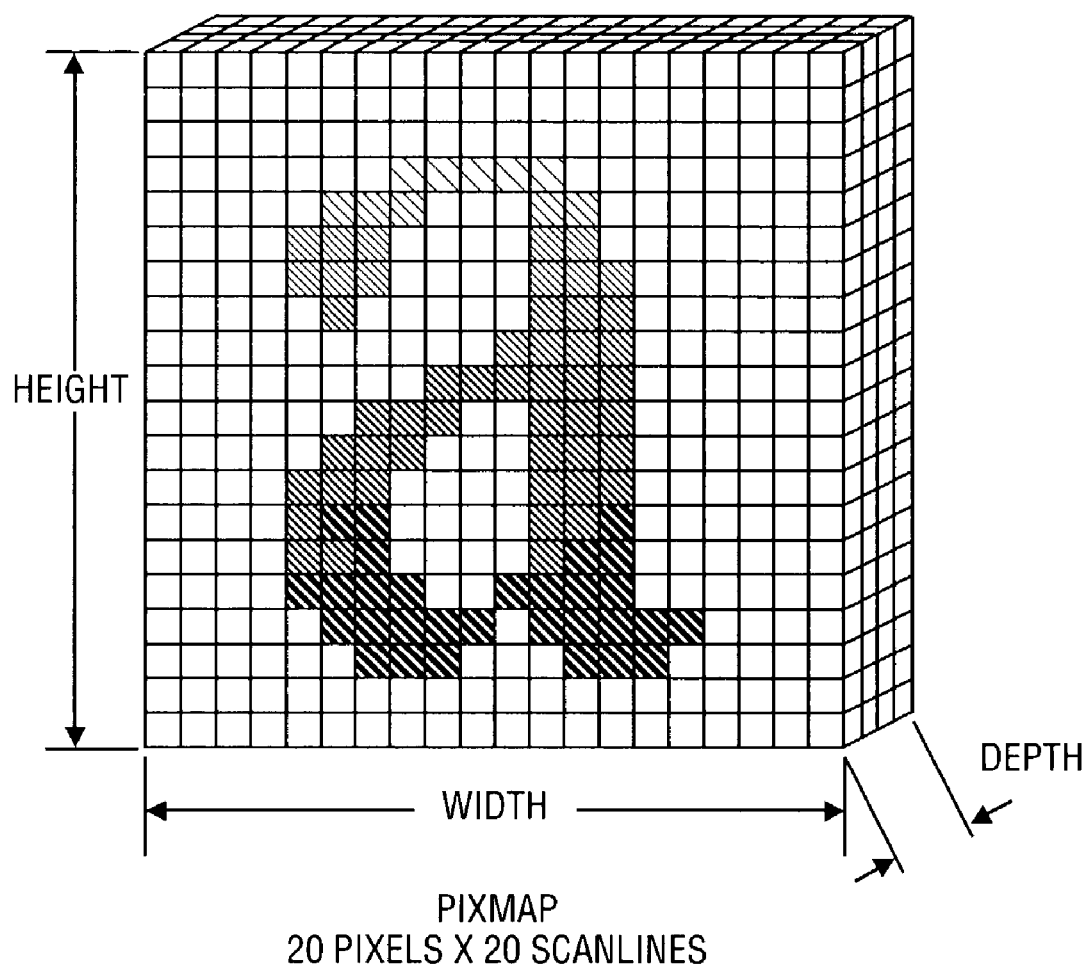
FIG. 5 is a pixelmap of the letter 'a'.

A pixelmap is a two dimensional array of memory bits, generally referred to as pixels or dots, as shown in FIG. 5. Each pixel is represented by a fixed number of bits. When stored in memory, this two dimensional array is represented in a contiguous run of pixels with no gaps or holes.

Each row of the array is referred to as a scanline or line. There is no special reference for each column of the array.

The X dimension of the pixelmap array is referred to as pitch, width, or warp. Width is commonly used to describe smaller arrays, such as character pixelmaps. Warp is typically used when describing page image pixelmaps. The warp of a pixelmap is a particularly useful parameter in that it is the value that, when added to the position in memory of a particular pixel of a scanline, results in a position in the same pixel column in the next lower scanline; warp is the amount to move to result in a Y-only movement within the pixelmap.

The Y dimension of the pixelmap array is referred to as height.

In addition to the physical size of the pixelmap, there are two other attributes associated with it: a physical base address for the upper left pixel of the array and, optionally, a logical Y coordinate for the first line of the array. The physical base address is a pixel address. The logical Y coordinate is required for banding.

In one embodiment, there are four distinct types of pixelmaps used by the graphic orders: a frame, an unbanded pixelmap, a banded pixelmap, and a halftone pixelmap.

In one embodiment, a frame is a two dimensional array of pixels that is generally a subset of a larger pixelmap array. Typically, a frame describes the bounding box of a character.

Frames are subtly different than pixelmaps in that width and warp are identical in a frame. When transferring a rectangle to a pixelmap, both the warp of the pixelmap and the width of the rectangle being transferred must be specified. When transferring a rectangle to a frame, the warp is the width of the rectangle being specified.

Operations, which involve transferring pixels to frames, are particularly useful when a small rectangle of a larger image must be cut and saved for future reference. The frame is the smallest possible storage means for the small rectangle because the scanlines are completely compacted in memory; the end of one scanline and the beginning of the next have no unused pixels between them.

In one embodiment, an unbanded pixelmap is simply a pixelmap which has no logical coordinate associated with its Y axis. When specifying an unbanded pixelmap in a transfer of data, it is assumed that the pixelmap is of sufficient size to complete the transfer. This requires that sufficient memory be allocated to contain the transfer. Another way of thinking about it is that no bounds checks are made for unbanded pixelmaps.

In one embodiment, a banded pixelmap is simply a pixelmap which has a logical coordinate associated with its Y axis. When specifying a banded pixelmap in a transfer of data, the transfer of data is checked against the Y bounds of the pixelmap. If the data would fall beyond the Y bounds of the pixelmap, a band fault occurs, and the transfer of data is prematurely terminated.

Upon termination of a graphic order, all parameters necessary to resume execution at the point where the band fault occurred are written back to the original graphic order, and the graphic order's band number is incremented (or decremented) to reflect the band where execution of the graphic order should resume.

By automatically updating graphic orders, which generate band faults, graphic orders, which span multiple bands, can be executed without the need for software intervention.

In one embodiment, a halftone pixelmap is a special type of pixelmap in that it is automatically replicated in both the horizontal and vertical direction. It is intended to hold a pattern which is repetitively applied to data being transferred from a source pixelmap to a destination pixelmap, causing a change in the appearance of the data (e.g., shading).

In one embodiment, up to three elements are needed when composing an image: a source image, a halftone image to be applied to the source image, and a (larger) destination image to which the final source is to be copied.

Each of these elements is located in a pixelmap. The source element is typically located in a "frame" pixelmap and the destination element is typically located in a "banded" or "unbanded" pixelmap. The halftone is always located in a "halftone" pixelmap.

Halftoning

Halftoning involves applying a "halftone screen" or pattern to a data transfer in order to modify its appearance. Halftone screens are used to produce shades of gray in a monochrome printing environment such as printing presses, dot matrix printers, or laser printers.

Halftone screens are repetitive in both the X and Y dimensions. For example, to achieve a 50% gray level, an alternating 10101010 01010101 pattern is used, where the 10101010 pattern is repeatedly applied to the even scanlines and the 01010101 pattern is applied to the odd scanlines.

Halftone screens are commonly seen in a newspaper where a photograph with levels of gray must be represented with a medium, which only allows black and white.

Description

Figure 1:
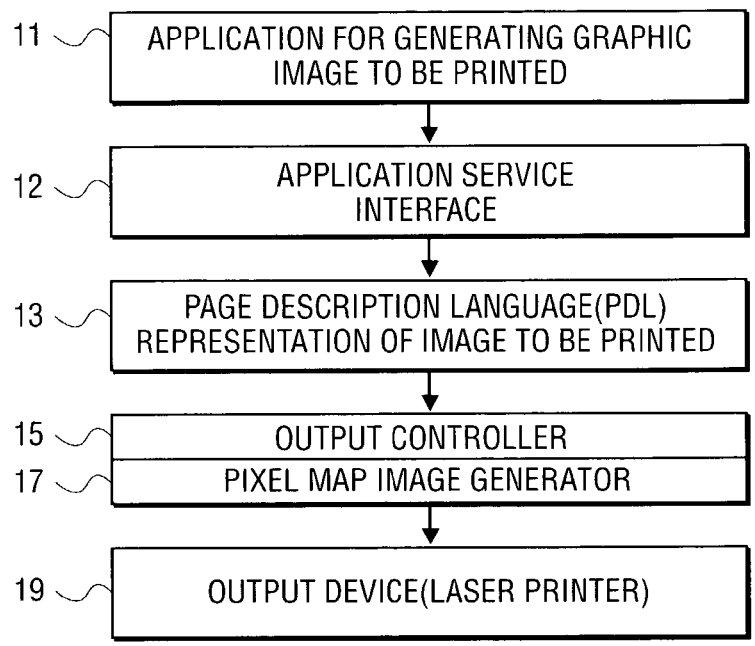
FIG. 1 is a block diagram of a process for generating a printed page.

FIG. 1 is a block diagram of one embodiment where an application 11 according to instructions from a user sends an application service interface a graphic image to be printed. The application service interface 12 generates a representation of an image to be printed in a page description language (PDL) 13 such as Postscript, which is available from Adobe Corporation. A PDL defines commands, which allow complete and precise control of pixelmap and halftone images as well as all of the attributes of character fonts including point size, orientation, shade and slant.

In one embodiment, the application service interface 12, which generates PDL instructions representing the image 13 is the same regardless of underlying hardware and/or software support. For example, assume a user instructs an application program to draw a line from point A corresponding to a pixelmap image coordinate of x1, y1 to point B corresponding to a pixelmap image coordinate of x2,y2. Such an instruction would generate a series of Postscript instructions (excluding page and line setup instructions) as follows:

Newpath
x1 y1 moveto
x2 y2 lineto stroke

In one embodiment, there is no special hardware and no banding and the PDL instructions are, in effect, directions to a PDL interpreter in output controller 15 which produces the page image. The PDL interpreter interprets the PDL instructions, producing graphics objects and character pixelmaps as directed. Only a few of the PDL instructions result in drawing. The remaining instructions control the use and positioning of objects in the page image.

For example, in the Postscript instructions above, the newpath operator causes the PDL interpreter to initialize internal information to control subsequent operations. The moveto operator establishes an initial position within the coordinate system. The lineto operator establishes a new position with an unexpressed or "uninked" line between the initial position and the new position. When the interpreter processes the stroke operator, it will generate one or more graphics commands to underlying pixel drawing routines, which draw the line in the page image memory.

In one embodiment, output controller 15 utilizes a graphics interface. The graphics interface includes graphics support routines, which operate in the coordinate system of the output device 19. The origin of the image coordinate system of the output device corresponds to the first pixel written to the output device. The x-axis of the image coordinate system is parallel to the output device scan (e.g., raster) lines. Thus, in left to right printing, pixels are output in increasing x-coordinate order, but in top to bottom printing, scan lines are output in increasing y-coordinate order.

In one embodiment, the PDL interpreter component of the output controller specifies the size of the page image by giving its width and length. The PDL interpreter part of the output controller also specifies the placement of the image within the physical page by supplying top and left margin parameters. These parameters are expressed in pixels.

In one embodiment, the graphics interface of output controller 15 creates two types of calls as follows:
calls relating to pages; and
calls which draw bit images.

In one embodiment, calls relating to pages are as follows:

New Page—performs initialization for a new page image.

End Page—starts the realtime printing process if the output device is idle or queues the image orders if the output device is busy.

Abort Page—if the printing phase has not started, throws away the orders for the page.

Abort All—throws away all pages waiting to be printed.

In one embodiment, six classes of pixel image drawing calls are used:

a two operand blit, which for example performs a two dimensional block transfer between two pixelmaps, a source and a destination.

a three operand blit, which for example performs a two dimensional block transfer using three pixelmaps, a source, a halftone, and a destination.

a draw scanline operation, which for example writes pixel groups on a contiguous block of scanlines within the destination pixelmap. The input includes a table defining pixel groups to be written.

a draw scanline halftone operation, which for example writes pixel groups to the destination pixelmap according to the contents of a halftone source pixelmap and a table defining pixel groups to be written.

a draw pixels operation, which for example draws individual pixels in the destination pixelmap according to a pixel table.

a draw pixels halftone, which for example draws individual pixels in the destination pixelmap according to the contents of a halftone source pixelmap and a pixel table.

In one embodiment, each of the six classes has at least two calls, one for writing to the page image pixelmap which the graphics subsystem interface manages; the other for a PDL interpreter managed destination, typically, a RAM user memory.

Interface to Pixel Image Drawing Calls

In one embodiment, pixelmap image drawing calls expect user and halftone pixelmap descriptors as input. A user pixelmap descriptor contains pixelmap origin byte address, e.g., the memory address of the upper left corner of the pixelmap, pixelmap width in pixels, e.g., the number of pixels per scanline, and pixelmap height in pixels, e.g., the number of scanlines. Pixelmap width and height may be arbitrary pixel values. Clipping occurs to the specified pixelmap width and height for destination pixelmaps; no source pixelmap clipping is performed.

In one embodiment, user pixelmap dimensions have no boundary constraints and a halftone pixelmap width is constrained to be 0 mod 32 pixels (32-bit word multiple). In addition to pixelmap origin, width, and height, a halftone pixelmap descriptor has three additional fields. Two of the additional fields are x,y origin parameters specifying the point in the halftone pixelmap that corresponds to the destination pixelmap origin. The third additional field provides halftone pixelmap size in bytes. Halftone pixelmap usage wraps instead of clipping. This causes the halftone pixelmap to appear to repeat in the destination pixelmap in both the x and y dimensions.

In one embodiment, the contents of a source pixelmap do not change except by means of subsequent calls to the graphics support routines performed by output controller 15.

Figure 2:
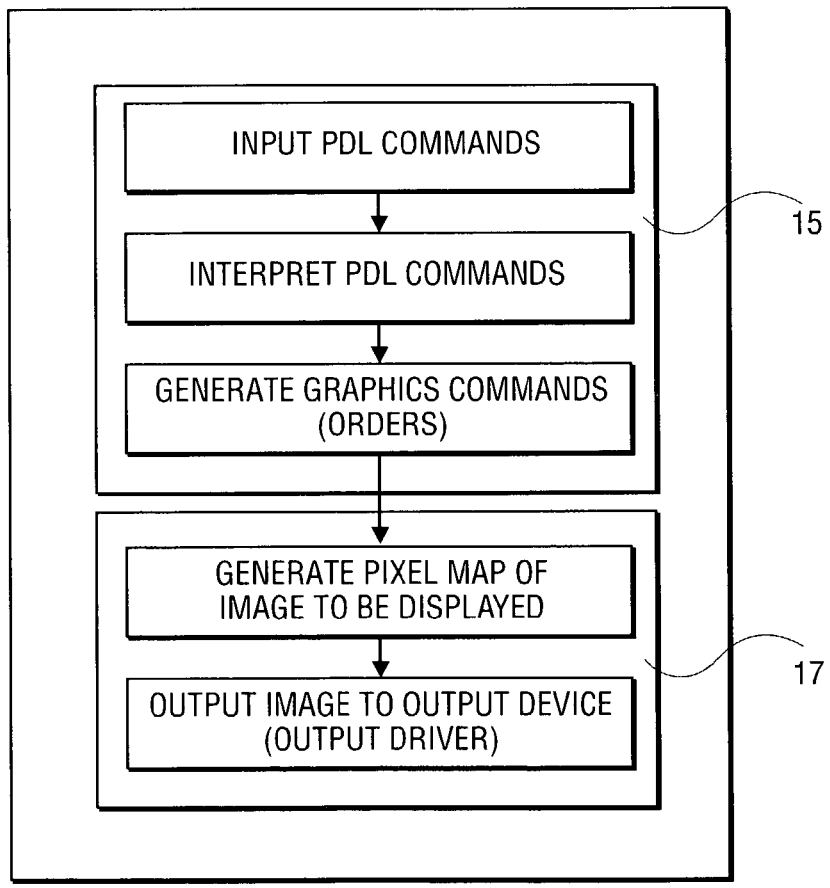
FIG. 2 is a block diagram of an output controller and pixelmap generator.

FIG. 2 shows the functions performed by output controller 15 which inputs PDL commands, interprets the PDL commands and generates graphics commands or orders, and by pixelmap image generator 17 which generates a pixelmap of the image to be printed from the graphics orders and outputs the image to the printer.

Graphic Order Overview

In one embodiment, the Graphics Execution Unit operates on lists of commands, termed a display list, which consists of a sequence of graphic orders. A graphic order directs the GEU to perform a discrete function, from setting internal environment registers, to executing bit-block or scanline transfers.

TABLE 2

Graphic Order Instruction Set

| | | |
|---|---|---|
| Initialization Orders | SET_BOOL_D | Set Boolean code for one operand graphic orders |
| | SET_BOOL_HD | |
| | SET_BOOL_SD | Set Boolean code for two operand graphic orders |
| | SET_BOOL_SHD | |
| | SET_DBMAP | Set Boolean code for two operand graphic orders |
| | SET_DWB | |
| | SET_EOBA | Set Boolean code for three operand graphic orders |
| | SET_HMAP | |
| | SET_PSUBL | Set destination banded pixmap parameters |
| | SET_BASEA | |
| | SET_SCMAP | Set destination banded pixmap warp parameter |
| | SET_SMAP | |
| | | Set end of band physical pixel address parameter |
| | | Set halftone pixmap parameters |
| | | Set signed difference between physical and logical address parameter |
| | | Set base address for all physical addresses |
| | | Set source contone pixmap parameters |
| | | Set source pixmap parameters |
| Control Orders | FLAG | Embed software flag in orderlist |
| | JUMP | Jump to specified graphic order in orderlist |
| | NOP | No operation |
| | STOP | Stop execution of orderlist |
| BitBLT Orders | BLT_D$_B$ | One operand bitBLT to banded |
| | BLT_SD$_B$ | Two operand bitBLT to banded pixmap |
| | BLT_SHD$_B$ | Three operand bitBLT to banded pixmap |
| Expansion Orders | BLT_SxD$_B$ | Two operand expanded bitBLT to banded pixmap |
| | BLT_SxHD$_B$ | Three operand expanded bitBLT to banded pixmap |
| Scanline Orders | SLT_D$_B$ | One operand scanline transfer to banded pixmap |
| | SLT_HD$_B$ | Two operand scanline transfer to banded pixmap |

In one embodiment, there are five types of graphic orders: initialization, control, bitBLT (bit-block transfer), expanded transfer, and scanline transfer. The initialization, bitBLT, and expanded graphic orders are processed as a stream of instructions from the orderlist. The scanline graphic orders include a pointer to a scanline table, which is a compressed run-length encoding of an image such as a font character, and optionally a pointer to a companion halftone table, which provides halftoning information for scanline tables.

All GEU data must reside in SDRAM. This includes graphic orders, scanline tables, companion halftone tables, and all pixelmaps.

In one embodiment, initialization graphic orders define pixelmap parameters and Boolean codes that may be common to more than one transfer order. The GEU allows three different pixelmaps to be defined simultaneously: a banded pixelmap, a source pixelmap, and a halftone pixelmap. There is a SET_xMAP order for each type of pixelmap. Pixelmap parameters thus set are used by all subsequent graphic orders that operate on the given pixelmap. Since several transfers typically operate on the same pixelmap, compaction of the orderlist is achieved by specifying a pixelmap's parameters only once per set of graphic orders.

The same practice is used for defining Boolean codes. Four Boolean codes may be defined simultaneously, one each for (1) destination only transfers, (2) halftone and destination transfers, (3) source and destination transfers, and (4) source, halftone, and destination transfers. There is a SET_BOOL_x order for each combination. Since several transfers typically apply the same Boolean function, compaction of the orderlist is achieved by specifying a Boolean code only once per set of graphic orders.

Initialization orders also define the depth of the destination and source pixelmaps (halftone depth is inferred).

In one embodiment, there are four graphic orders that control the execution order of an orderlist: FLAG, JUMP, NOP, and STOP. FLAG and NOP may be used for software to extend orderlist functionality. JUMP allows execution of an orderlist to transfer to a non-sequential point in memory. STOP signals the end of the orderlist, and posts an interrupt event to the scheduler.

In one embodiment, there are three bitBLT graphic orders based on number of operands (one, two or three).

These graphic orders rely on parameters being previously set with certain initialization orders. Removing parameters that are typically common to several bitBLT operations makes each bitBLT graphic order smaller and results in an orderlist that occupies less memory space.

A bit-block transfer (bitBLT) involves operating on a specified rectangle on one or more specified pixel maps. The specified rectangle, termed a transfer frame, is usually a subset of the destination pixelmap. A source and/or halftone pixelmap may also be applied to the destination.

In one embodiment, there are two expanded bitBLT graphic orders based on the number of operands (two or three).

As with the bitBLT orders, these graphic orders rely on parameters being previously set with certain initialization orders. Removing parameters that are typically common to several expanded bitBLT operations makes each expanded graphic order smaller and results in an orderlist that occupies less memory space.

An expanded bit-block transfer (bitBLT) is similar to a simple bitBLT operation, except that the source pixelmap is treated as a low-resolution pixelmap, known as an unexpanded pixelmap. An expanded transfer involves expanding the source pixelmap "on the fly," and applying it to the destination pixelmap. A halftone may also be specified during the transfer.

In one embodiment, there are two different scanline graphic orders based on the number of operands (one or two). As with other orders, the scanline graphic orders rely on parameters being previously set with certain initialization orders.

A scanline transfer involves operating on a specified set of scanline runs on one or more specified pixelmaps. The set of scanline runs is defined by a scanline table, which contains a series of pixstring specifiers. Each pixstring specifier is a compressed run-length encoding of a scanline run. The compressed format of scanline tables not only saves memory, but also improves performance since fewer memory fetches have to be performed.

The set of scanline runs determines what portions of the specified pixelmaps are modified. The set of scanline runs also describes a transfer region. Only pixels within the transfer region described by a scanline table are modified by a scanline operation. The transfer region is similar to a bitBLT operation's transfer frame, except the area described by a transfer region can be non-rectangular and disjoint.

Figure 3:
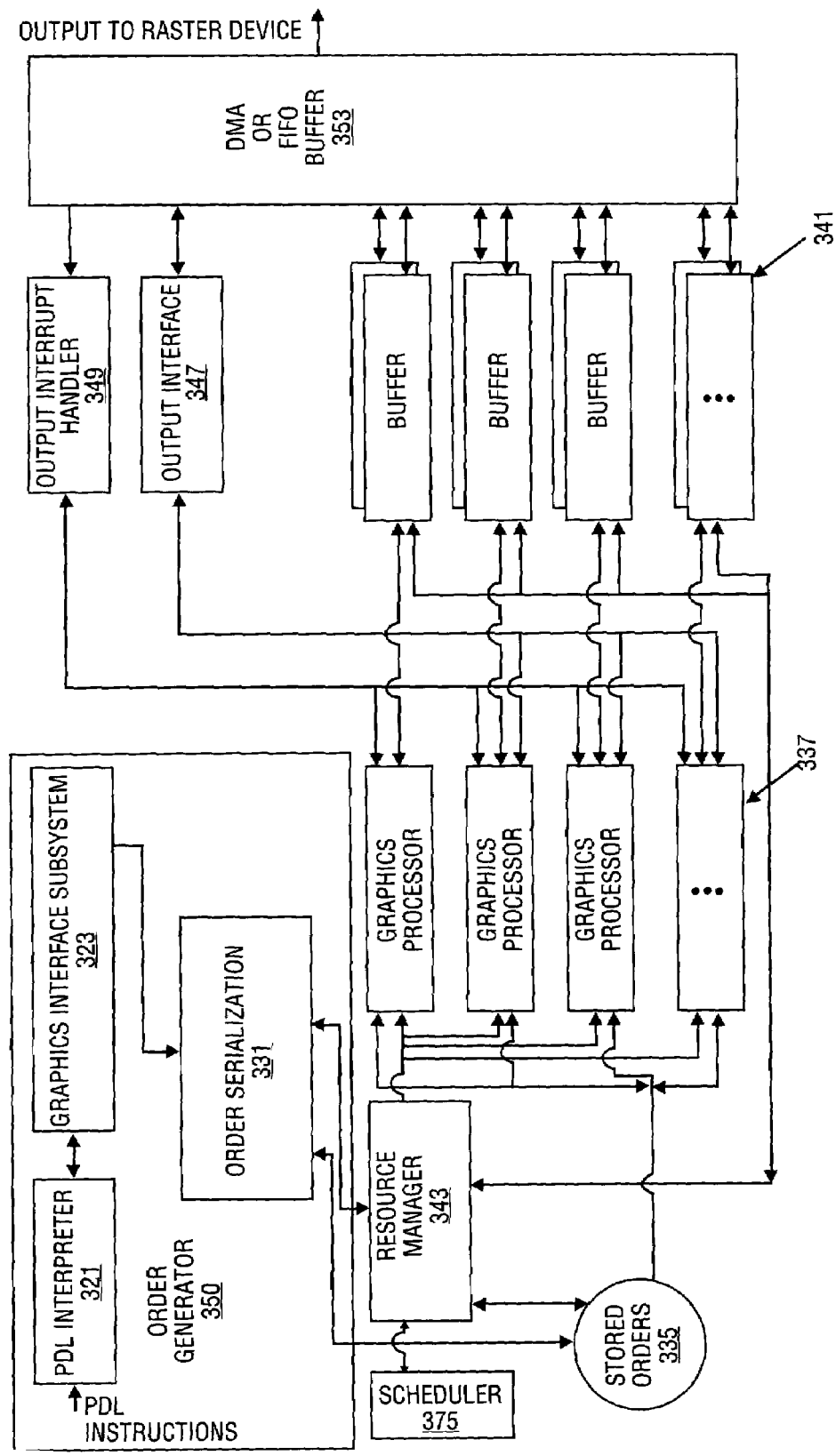
FIG. 3 is a block diagram of a system for image generation with multiple bit block transfer processes.

FIG. 3 is a functional block diagram showing one embodiment of output controller 15 and pixelmap image generator 17.

The following is a brief description of each of the functional elements comprising the invention as shown in FIG. 3.

Order Generator 350

In one embodiment, graphics orders are generated by an order generator 350 to be stored for later rendering. The order generator 350 generates the graphics orders using a page description language (PDL) interpreter module 321, graphics interface subsystem 323 and order serialization module 331.

In one embodiment, the order generator 350 includes a working memory for processing PDL instructions into graphics orders. In one embodiment, order generator 350 is implemented in software (e.g., microcode or higher level computer languages) as a set of software modules to be executed by a CPU. A software implementation may be stored on a machine readable medium. A "machine readable" medium may include any medium that can store or transfer information. Examples of a machine readable medium include a ROM, a floppy diskette, a DC-ROM, or optical disk, a hard disk, a radio frequency (RF) links, etc. In another embodiment, order generator 350 is implemented as a set of hardware components.

Graphics Interface Subsystem 323

In one embodiment, the PDL interpreter module 321 calls the graphics interface subsystem 323 which is a set of standard interface routines for graphics services when the PDL interpreter module 321 has a page or job ready to be processed. The graphics interface subsystem 323 processes the PDL into graphic orders to be stored for later processing into pixelmap images.

In one embodiment, after the orders have been constructed, the graphics interface subsystem 323 returns to PDL interpreter module 321.

Order Serialization Module 331

In one embodiment, an order serialization module 331 processes orders, which are stored in a memory or storage device 335 for subsequent use during processing performed by a processor 337.

In one embodiment, orders are compacted in accordance with the methods known in the art for compacting data and instructions. Compaction can provide major reductions in the amount of memory required in many cases including cases where the blits overlap.

Order Storage 335

In one embodiment, orders storage 335 is an internal representation of commands to create the images the application requested.

In one embodiment, the order storage is memory location independent. Graphics order can be relocated in memory when retrieved from storage without affecting the processing of the graphics order.

In one embodiment, the internal representation is a set of graphics orders that define a pixelmap to be output to the printer device. The orders are stored in a data storage device until fetched by a resource manager 343 or a processor 337.

In one embodiment, the storage device is a physical storage device such as a hard disk drive or tape drive. In another embodiment, the orders are stored in a memory device such as a RAM device. It would be understood that any device capable of storing and retrieving data and instructions could be used to store the orders.

Graphics Processors 337

In one embodiment, there is an array of graphics processors 337 to render pixelmap images for output to a printer device. A scheduler 375 assigns graphic orders or sets of graphic orders to each graphics processor 337 for that processor to render into a pixelmap image.

In one embodiment, when a graphics processor 337 renders a pixelmap image, the graphics processor 337 has a working memory (e.g., RAM device) to utilize in completing the rendering of the pixelmap image. The completed pixelmap image is then stored in an associated buffer 341 or one of an array of buffers 341. Alternatively, the graphics processor 337 will render a pixelmap image from graphics orders fetched from the order storage 335 directly into a buffer or segment of a buffer 341.

In one embodiment, the graphics processor 337 will signal that it is ready to the scheduler 375 or resource manager 343 whenever it completes the rendering of an assigned set of graphics orders or on startup. In one embodiment, each graphics processor 337 has a queue for graphics orders assigned to the graphics processor 337.

In one embodiment, the graphics processor 337 traverses the assigned stored graphic orders once for a band of a pixelmap image to be generated. When all orders assigned relating to the band have been processed, the processor 337 signals the output interface 347 to queue the band for output. If buffer memory 341 is available to process another band of a pixelmap image, the graphics processor 337 begins the rendering of the next queued band. If no band or graphic orders are queued, the graphics processor 337 signals the scheduler 375 that it is ready to process another band.

In one embodiment, the graphics processor 337 traverses all assigned graphics orders associated with an entire page once to render a pixelmap image for the page. When all orders associated with the page are processed, the processor 337 signals the output interface 347 to queue the page for output to the printer device. If buffer memory 341 is available to process another page, the graphics processor 337 begins processing the next queued page. If no graphic orders have been queued, then the graphics processor 337 signals the scheduler 375 that it is ready to process another page.

In one embodiment, the graphics processor 337 traverses all assigned graphic orders associated with a plane of a page once to render a pixelmap image for the page. For example, color images are often printed as four separate planes of color (e.g., cyan, magenta, yellow and black) and each plane of the color image can be separately rendered and printed. When all orders associated with a plane are processed, the processor 337 signals the output interface to queue the page for output to the printer device. If buffer memory 341 is available to process another plane, the graphics processor 337 begins processing the next queued page. If no graphics orders have been queued, then the graphics processor 337 signals the scheduler 375 that it is ready to process another page.

In one embodiment, graphics processors 337 are implemented using software. In one embodiment, a hardware implementation incorporates the output FIFO or DMA device 353. A hardware implementation of the graphics processor does the same type of order updating as that performed by a software implementation. However, since a hardware implementation runs much faster than a software implementation, the hardware implementation can band much more complex pages and keep up with much faster output devices. It also may employ a separate hardware bus for access to the buffers 341.

However, in a hardware implementation, software may be used to construct the stored orders since the order information must be represented in a manner suitable for processing by a state machine which can be implemented in a cost effective manner.

In one embodiment, each graphics processor 337 is a separate card (e.g., a PCI card). The graphics processor 337 has subcomponents on the card including memory components (e.g., RAM and registers) and a graphics execution unit, and similar resources. The memory components are used to implement queue structures for orderlists and graphics orders that are to be processed by the graphics execution unit (GEU). The GEU renders pixelmap images from graphics orders using a working memory (e.g., on card RAM and registers) and a buffer 341. Alternatively, the graphics processor 337 subcomponents may be on a main board or in any combination over a main board and a card. An advantage of placing a graphics processor on a card is that the expandability and upgrading of the system to handle larger and more complex jobs is facilitated by adding or upgrading graphics processor 337 cards.

Buffers 341

In one embodiment, buffers 341 are a random access memory array used to hold the pixelmap images. Each graphics processor 337 has a set of buffers 341 associated with it in which to store pixelmap images for output to the printer device. Each buffer 341 is configured to hold a pixelmap of a single page. Alternatively, each buffer may be configured to store a pixelmap of a band or plane generated by the graphics processor 337. Each buffer 341 is connected to the output interface 347 so that its contents can be transferred to the printer device when the printer device is ready.

In one embodiment, the array of graphics processors 337 shares an array of buffers 341. When an individual graphics processor 337 is ready to generate an image, the graphics processor 337 locks an available buffer 341 for its own use. Allocation of the buffers 341 is handled by the resource manager 343. Alternatively, the allocation of free buffers 341 could be handled by any device or component that tracks the used or free buffers 341 and assigns free buffers 341 to processors 337 ready to generate images including the processors 337 communicating between themselves to negotiate buffer 341 use, the scheduler 375 managing buffer 341 allocation in connection with the assignment of loads to processors 337, a separate buffer 341 allocation interface or the like.

In another embodiment, the graphics processors 337 share a single buffer 341 that has space for storing multiple pages, bands or planes. When a graphics processor 337 is ready to generate a page, band or plane, it is allocated sufficient space in the buffer 341 to store images to be generated. The resource manager 343 or like process or device allocates the buffer 341 space as needed to the graphics processors 337.

Resource Manager 343

In one embodiment, resource manager 343 allocates and deallocates blocks of memory in response to calls from graphics processors 337 and other components. Resource manager 343 is a software function that manages the memory 335 containing the stored orders and the buffers 341 according to well known memory management techniques which need to be employed when the other software or hardware components need to acquire or free blocks of memory. The actual pixelmap images to be printed are transferred from the buffers 341 to DMA hardware or a FIFO buffer 353 for transfer to a printer by operation of output interface 347, output interrupt handler 349, graphics processors 337 and resource manager 343.

Output Interface 347

In one embodiment, output interface 347 receives completed images from the graphics processors 337 and either passes them on to the output hardware 353 or queues them for output interrupt handler 349 to pass to the output hardware 353 when it is no longer busy. With the help of output interrupt handler 349, output interface 347 monitors synchronization signals from the printer engine to determine when it can deliver a band, page or plane for output. In one embodiment, a print engine sends a "frame sync" signal to indicate top of page. The output interface 347 cannot deliver any data until the "frame sync" signal is true.

In one embodiment, when a FIFO buffer is used as the output hardware 353, the software moves data from the buffers 341 to the FIFO a scanline, band, page or plane at a time. A DMA controller can be used the same way. For example, top and left margins can be created by delivering zeroes for an output device that writes black or by delivering ones for an output device that writes white. Alternatively, data can be moved to the FIFO or by the DMA at any level of granularity.

Output Interrupt Handler 349

In one embodiment, as the output hardware 353 finishes delivering a band, page, or plane to a video interface of the print engine, it generates an interrupt. The output interrupt handler 349 fetches the next band, page or plane from its queue and passes it to the output hardware 353. It then signals to the resource manager 343 that buffer 341 is free so that a graphics processor 337 may use it to generate an image.

Output Hardware 353

In one embodiment, when banding, page generation or plane generation is implemented in software, a FIFO or DMA controller is used to handle video output to the print engine. If the banding, page generation or plane generation implementation is done in hardware, it may incorporate a FIFO or DMA controller output hardware 353.

In one embodiment, the output hardware includes a Print Engine Video Controller (PVC). The PVC contains four video channels, which operate independently of one another. Each PVC channel contains a dedicated DMA controller that automatically retrieves raster image data from buffers 341 using burst cycles. The DMA controller can be configured to read the raster image data in any order: top-to-bottom, bottom-to-top, left-to-right, or right-to-left. This flexibility supports, for example, duplex applications. Each PVC channel also manages all parameters associated with its raster image data, including the insertion of horizontal and vertical margins. This type of print engine interface eliminates most software overhead associated with the transfer of the raster image data to the print engine.

In one embodiment, the functional elements shown in FIG. 3 are implemented in hardware, although if one or more of such elements are implemented in software, the functions performed by each such element is actually performed by operation of a microprocessor executing a set of instructions in a memory such that the microprocessor generates control signals appropriate to the function being performed. In this connection, just as the specific hardware implementation details are not needed for a person skilled in the field of the invention to make and use the same, the particulars of a microprocessor, memory, data and address bus, clock and the like needed to implement the invention in software would be readily apparent to a person skilled in the art based upon the description provided herein.

Scheduler 375

Figure 4:
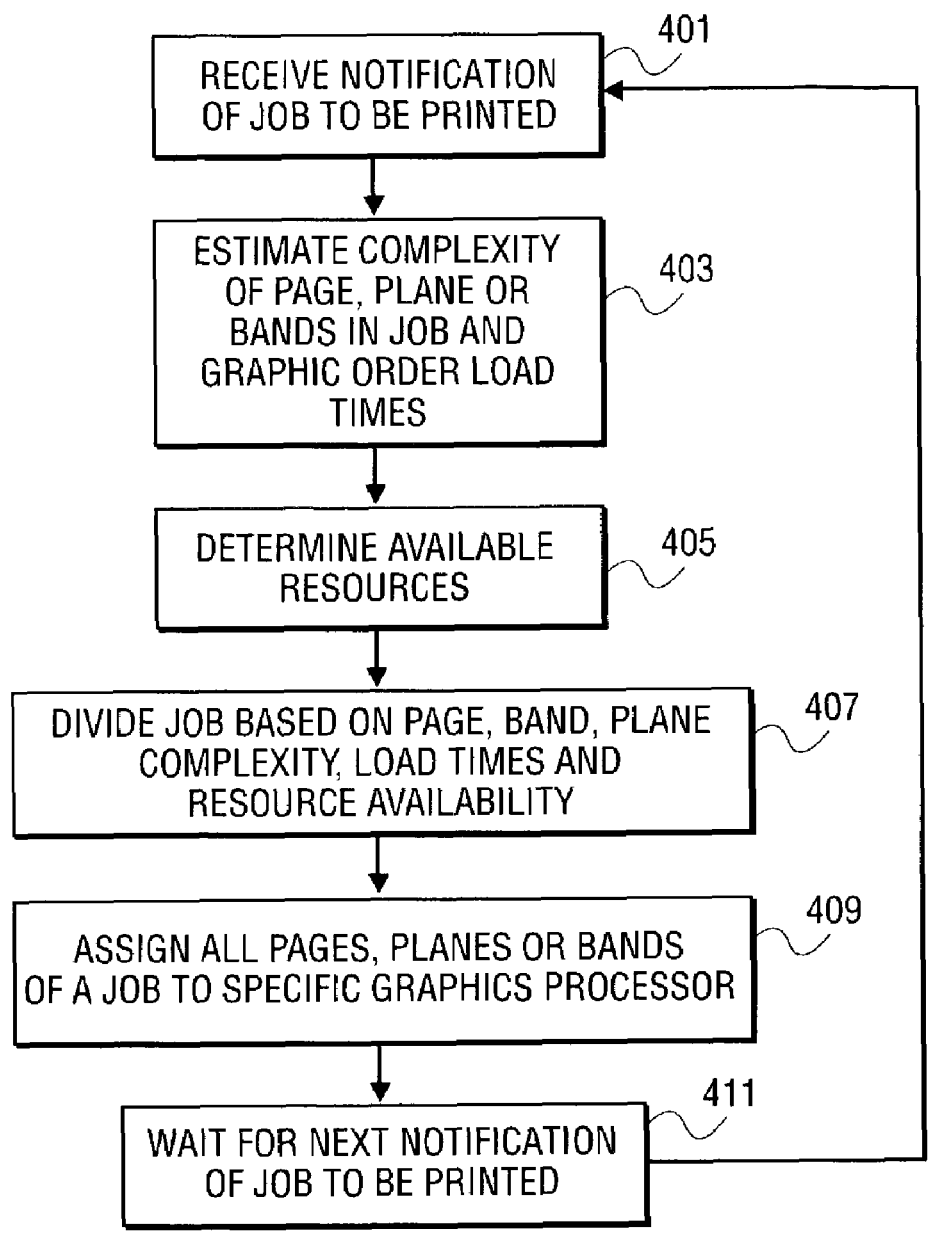
FIG. 4 is a flowchart of a scheduler.

FIG. 4 shows a flowchart for a scheduler 375. In one embodiment, the scheduler 375 receives requests or notifications from the graphics interface subsystem 323 to process a job or portions of a job (e.g., planes, pages and bands) (block 401). The scheduler 375 then analyzes the complexity data for subcomponents of the job (e.g., pages, planes and bands) which is generated during the order generation. In another embodiment, the scheduler 375 does the complexity analysis. For example, this analysis may include an estimated time for a graphics execution unit to render the subcomponent; the time to load the subcomponent from the order storage 335 into a graphics processor 337; prediction of print underruns; and estimates of page print times (block 403).

In one embodiment, the scheduler 375 determines the resources available to handle the job request (block 405). This determination includes, for example, available or idle graphics execution units; lengths of queues in graphics processors 337; available memory in graphics processors 337; available buffer space associated with a graphics processor; and complexity of queued job subcomponents in a graphics processor 337. After this determination is made the scheduler 375 groups graphics orders into orderlists based on the gathered information (block 407).

In one embodiment, the scheduler 375 assigns orderlists to graphics processors 337 by making an entry into a graphics processor's 337 queue (block 409). In this embodiment, the graphics processor 337 has an associated loader component that monitors and manages the queue. The loader sends requests to the resource manager 343 to fetch the set of graphics orders from the order storage unit 335 when there are sufficient resources to receive the graphics orders (e.g., sufficient RAM). In an alternate embodiment, the scheduler 375 manages the queue for each graphics processor 337 and sends requests to the resource manager 343 to fetch graphics orders from the order storage 335.

In one embodiment, the scheduler 375 assigns work to be done starting with a first graphics processor 337 (GP0) such that GP0 is kept at maximum possible utilization without stalling other graphics processors 337. If a graphics processor 337 stall were to occur by assigning the next page, band or plane to GP0, then the scheduler 375 attempts to assign the next set of graphics orders to other graphics processors 337 (GP1 . . . n) where just-in-time delivery results in completion of GEU operation at a time closest to the time that the page, band or plane needs to be output to an engine. This will result in less complex jobs never needing the services of GP1 . . . n. For example, when adding the next page to GP0 results in a queuing of graphics orders and rendering in time for the next page to be outputted at engine speed, it will also result in less complex bands, pages or planes consistently being assigned to GP0. Complex bands, pages or planes will be assigned to GP1 . . . n because their completion times will then be closer to the necessary time of output than if assigned to GP0.

Making an assignment to a graphics processor 337 affects its "high water mark", or the next available free time the graphics processor 337 can be used for GEU operations. The number of buffers 341 available will determine whether the high water mark for that graphics processor 337 must sync to completion of the calculated PVC operation for the page plane or band being assigned.

In one embodiment, after all subcomponents of a job have been assigned to a graphics processor 337 the scheduler 375 waits for the next notification or request from the graphics interface subsystem 323 (block 411). Alternatively, the scheduler 375 may have a queue for incoming notifications and will handle the next notification in the queue after it completes the scheduling of the previous notification.

In one embodiment, the scheduler 375 implements a round robin, FIFO or similar algorithm to assign graphics orders to graphics processors 337.

Graphics Execution Unit

In one embodiment, a graphics processor 337 contains a sophisticated execution unit optimized to render continuous tone, or contone, page images. This subsystem is known as the graphics execution unit (GEU). The GEU reads an orderlist from memory, which contains a sequential list of graphic instructions, called graphic orders. A graphic order directs the GEU to perform a discrete function, from setting an internal image control register, to executing a bit-block or scanline transfer.

In one embodiment, the GEU is a high performance pixel image processor. This level of performance enables the GEU to be used effectively in banding applications or in other high speed or high density pixelmap graphics products. The GEU is implemented using a Field Programmable Grid Array (FPGA), Application Specification Integrated Circuitry (ASIC), or similar device.

In one embodiment, the GEU is activated by writing the starting address of an orderlist to a GEU Start Register. The GEU executes the orderlist and renders a band, page or plane image. When the end of the orderlist is reached, the GEU posts an interrupt to the scheduler 375 and waits for another orderlist address. A second orderlist address can be loaded while the GEU is working on the first orderlist. In this case, an interrupt posts upon completion of the first orderlist and the second orderlist begins executing immediately. A second interrupt is posted upon completion of the second orderlist.

In one embodiment, the GEU can render an entire page from an orderlist or multiple bands from a single banded orderlist. A banded orderlist contains band information near the beginning of the list. This band information includes the address and size of the band as well as the band number that is to be processed. In one embodiment, the GEU loader uses this information to determine which orders from the orderlist to process. In one embodiment, the GEU requests buffer space from the resource manager 343 and receives an address for where in memory 341 to create the pixelmap image for a specific band, page or plane. After one band is fully rendered and the GEU posts an interrupt, software simply adjusts the order list to reflect the next band information and then restarts the GEU.

This interface between the scheduler 375 and the GEU allows complete freedom in the design of the banded memory system. Band parameters can be dynamically altered to suit a particular application or page complexity. A desired band number is included to allow for non-sequential band processing applications such as bottom-to-top printing.

Having disclosed exemplary embodiments, modifications and variations may be made to the disclosed embodiments while remaining within the spirit and scope of the invention as defined by the appended claims.

What is claimed is:

1. An apparatus for creating an image for output to a raster device, the apparatus comprising:
    an interpreter for at least one language for describing an image;
    a first interface for generating graphics orders coupled to the interpreter;
    a first storage device for storing graphics orders coupled to the interface;
    at least two first processors for processing graphics orders in parallel, the at least two first processors coupled to the storage device;
    at least one buffer for storing the output of the at least two first processors; and
    a control module configured to assign graphics orders to the at least two first processors based on available resources, status of the at least two first processors, queue length for each of the first two processors, available memory in each of the first two processors and a complexity of a job or portion of a job, the control module coupled to the first storage device and the at least two first processors,
    wherein the complexity is based on estimated job subcomponent execution time, job subcomponent load time and print under run prediction.

2. The apparatus of claim 1 wherein each of the at least one buffer is associated with at least one of the at least two first processors.

3. The apparatus of claim 1 wherein the control module is configured to assign a band to each of the at least two first processors to render in parallel.

4. The apparatus of claim 1 wherein the control module is configured to assign a page to each of the at least two first processors to render in parallel.

5. The apparatus of claim 1 wherein the control module is configured to assign a plane to each of the at least two first processors to render in parallel.

6. The apparatus of claim 1 further comprising:
    a second storage device for storing graphics orders coupled to the interface; and
    a resource management module for enabling parallel reads of the first and second storage device by the at least two first processors.

7. The apparatus of claim 1, wherein the interpreter and the first interface are associated with a second processor.

8. An apparatus for creating a page image that includes graphics information for output to a raster device, the apparatus comprising:
    means for receiving commands which define the page image to be output;
    means for generating a set of graphics orders which represent the page image being created from the received commands;
    means for generating pixelmap images from the graphics orders
    means for outputting the generated pixelmap images to the output device; and
    means for scheduling the set of graphics orders to the means for generating pixelmap images based on available resources, an operating status of the means for generating pixel map images, queue length for the means for generating pixel map images, available memory in the means for generating pixel map images and complexity of a job or portion of a job;
    wherein the graphics orders generation means comprises
        graphics interface subsystem means for receiving the commands and passing the received commands to memory storage device;
    wherein the pixelmap generating means comprises
        at least two processor means for generating the pixelmap images; and
        at least one storage means for storing the pixelmap images before outputting to the output device,
    wherein the complexity is based on estimated job subcomponent execution time, job subcomponent load time and print under run prediction.

9. The apparatus of claim 8 wherein the at least two processor means generate the pixelmap images for a first page and a second page in parallel.

10. The apparatus of claim 8 wherein the at least two processor means generate the pixelmap images for a first band and a second band in parallel.

11. The apparatus of claim 8 wherein the at least two processor means generate the pixelmap images for a first plane and a second plane in parallel.

12. A method for scheduling graphic order sets to a plurality of processors comprising:

receiving commands which define a page image to be output;

generating a set of graphics orders which represent the page image being created from the received commands;

generating pixelmap images from the graphics orders;

outputting the generated pixelmap images to the output device; and scheduling the set of graphics orders to a first processor and a second processor based on available resources, an operating status of the first processor and the second processor, queue length for the first processor and second processor, available memory in the first processor and the second processor and complexity of a job or portion of a job, and wherein the complexity is based on estimated job subcomponent execution time, job subcomponent load time and print under run prediction.

13. The method of claim 12 wherein the complexity of the job or portion of the job includes an estimated time to execute the graphic orders associated with a first segment of the job.

14. The method of claim 12 wherein the complexity of the job or portion of the job includes an estimated time to load the graphic orders associated with a first segment of the job to be processed by the first processor or the second processor.

15. The method of claim 13 wherein the first segment is a page.

16. The method of claim 13 wherein the first segment is a plane.

17. The method of claim 13 wherein the first segment is a band.

18. The method of claim 12 further comprising: balancing a load between the first processor and a second processor to allow the rendering of a first segment of a job and a second segment of a job to complete approximately simultaneously.

19. The method of claim 18 wherein balancing the load includes examining the memory usage of the first processor to increase the load of the second processor with low memory usage.

* * * * *